(12) United States Patent
Bickert et al.

(10) Patent No.: US 11,092,261 B2
(45) Date of Patent: Aug. 17, 2021

(54) BRACKET ASSEMBLY FOR SECURING CONDUITS OF A MACHINE

(71) Applicant: Caterpillar Inc., Deerfield, IL (US)

(72) Inventors: Christian Bickert, St. Martin d'Hères (FR); Sylvain Errant, Grenoble (FR); Romain Mezouri, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/433,924

(22) Filed: Jun. 6, 2019

(65) Prior Publication Data

US 2020/0386349 A1 Dec. 10, 2020

(51) Int. Cl.
*F16L 3/223* (2006.01)
*B60R 16/02* (2006.01)
*F16L 3/10* (2006.01)

(52) U.S. Cl.
CPC ............ *F16L 3/2235* (2013.01); *B60R 16/02* (2013.01); *F16L 3/1066* (2013.01); *B60Y 2200/411* (2013.01)

(58) Field of Classification Search
CPC ...... F16L 3/2235; F16L 3/1066; B60R 16/02; B60Y 220/411; B60Y 2200/411
See application file for complete search history.

(56) References Cited

U.S. PATENT DOCUMENTS

| | | | | |
|---|---|---|---|---|
| 2,355,742 A * | 8/1944 | Morehouse | ............ | F16L 3/2235 248/68.1 |
| 5,098,047 A * | 3/1992 | Plumley | ................ | F16L 3/2235 248/68.1 |
| 6,079,673 A * | 6/2000 | Cox | ...................... | F16L 3/1041 174/40 R |
| 6,561,466 B1 * | 5/2003 | Myers | ..................... | F16L 3/221 248/68.1 |
| 6,902,138 B2 | 6/2005 | Vantouroux | | |
| 7,201,351 B2 | 4/2007 | Stigler | | |
| 7,328,873 B2 | 2/2008 | Suzuki et al. | | |
| 8,702,044 B2 | 4/2014 | Railsback et al. | | |
| 8,910,912 B2 * | 12/2014 | Child | .................... | F16L 3/2235 248/73 |
| 8,985,533 B2 * | 3/2015 | Edmond | ............... | F16L 3/1222 248/68.1 |
| 10,151,406 B2 | 12/2018 | Netke et al. | | |
| 10,293,769 B2 * | 5/2019 | Krohn | ................... | F16L 3/2235 |
| 2006/0273226 A1 | 12/2006 | Jatzke | | |
| 2017/0030487 A1 * | 2/2017 | Sampson | ............ | B60R 16/0215 |

FOREIGN PATENT DOCUMENTS

| | | |
|---|---|---|
| DE | 69303229 T2 | 1/1997 |
| IN | 266221 B | 4/2015 |

* cited by examiner

*Primary Examiner* — Anita M King

(57) ABSTRACT

A bracket assembly for securing a plurality of conduits includes a base including at least one recess, the recess defined by a bottom surface and a pair of side surfaces and a securing member configured to mate with the base and extend across the recess to form a conduit-receiving area. The bracket assembly also includes at least one adapter coupled to the recess to reduce the size of the conduit-receiving area.

16 Claims, 3 Drawing Sheets

BRACKET ASSEMBLY FOR SECURING CONDUITS OF A MACHINE

TECHNICAL FIELD

The present disclosure relates generally to securements for a machine, and more particularly, to a bracket assembly for securing conduits of a machine.

BACKGROUND

Machines, such as stationary or mobile industrial machines, may employ hoses, pipes, wiring, or other conduits to route fluids or electric wires to various locations of the machine. For example, such machines may include an internal combustion engine, a hydraulic motor, an electric motor, and/or accessory devices that are positioned at various locations within the machine and are connected to conduits to receive or deliver fluids or electricity. The conduits may convey, for example, hydraulic fluid, thermal management fluid, fuel, compressed air, or electricity between associated components of the machine. Such conduits may extend from the front to the rear of the machine, and/or may follow a tortuous path through the machine. Thus, these conduits may need to extend through tight spaces and bends. A series of clamps may be employed to secure these conduits in position and prevent movement of the conduits. Typically, such clamps include an opening that can be tightened around an outer circumference of the conduit. Another portion of the clamp may be secured to the body or frame of the machine to limit movement of the conduit during operation.

Adequately securing a plurality of conduits may require the use of a large number of clamps, such as P-clamps, as these clamps are capable of securing a portion of only a single conduit to a particular location on a machine. The individual use of such clamps may require a large amount of space and may increase time needed for assembly, maintenance, and/or repair of the machine. Some clamps may include tightening mechanisms that reduce the size of an opening that receives the conduit. However, it may be possible to under-tighten or over-tighten such tightening mechanisms, which may allow the conduit to move during operation, which could cause excessive wear or damage to the conduit, or could restrict flow through the conduit.

An exemplary clamping device for retaining and organizing an elongated body, such as a conduit, is disclosed in IN 266221 B to Rao et al. ("the '221 patent"). The clamping device disclosed in the '221 patent includes a plurality of clamps that each have a set of snaps. These individual clamps are received by a base within individual openings. While the clamping device disclosed in the '221 patent may be useful in some circumstances, it may require a large amount of space as each clamp is employed for a separate opening. Further, the '221 patent may be limited in the alternative configurations possible, and conduit size variations that can be secured.

The disclosed method and system may solve one or more of the problems set forth above and/or other problems in the art. The scope of the current disclosure, however, is defined by the attached claims, and not by the ability to solve any specific problem.

SUMMARY

In one aspect, a bracket assembly for securing a plurality of conduits may include a base including at least one recess, the recess defined by a bottom surface and a pair of side surfaces and a securing member configured to mate with the base and extend across the recess to form a conduit-receiving area. The bracket assembly may also include at least one adapter coupled to the recess to reduce the size of the conduit-receiving area.

In another aspect, a bracket assembly for securing a plurality of conduits may include a base including at least one recess, the recess defined by a bottom surface and a pair of side surfaces and a securing member configured to mate with the base and extend across the recess to form a conduit-receiving area. The bracket assembly may also include a plurality of sockets formed in the bottom surface of the base and opening to the conduit-receiving area.

In yet another aspect, a bracket assembly for securing a plurality of conduits may include a base including at least one substantially U-shaped recess, the recess defined by a bottom surface and a pair of side surfaces, the base further including a fastener bore located on each side of the recess, and the recess includes a plurality of sockets and a securing plate configured to mate with the base and extend across the recess to form a conduit-receiving area. The bracket assembly may also include at least one adapter coupled to the recess to reduce the size of the conduit-receiving area, the adapter including a plurality of protrusions, and the adapter being coupled to the recess by mating of the protrusions and sockets.

DETAILED DESCRIPTION

Figure 1:
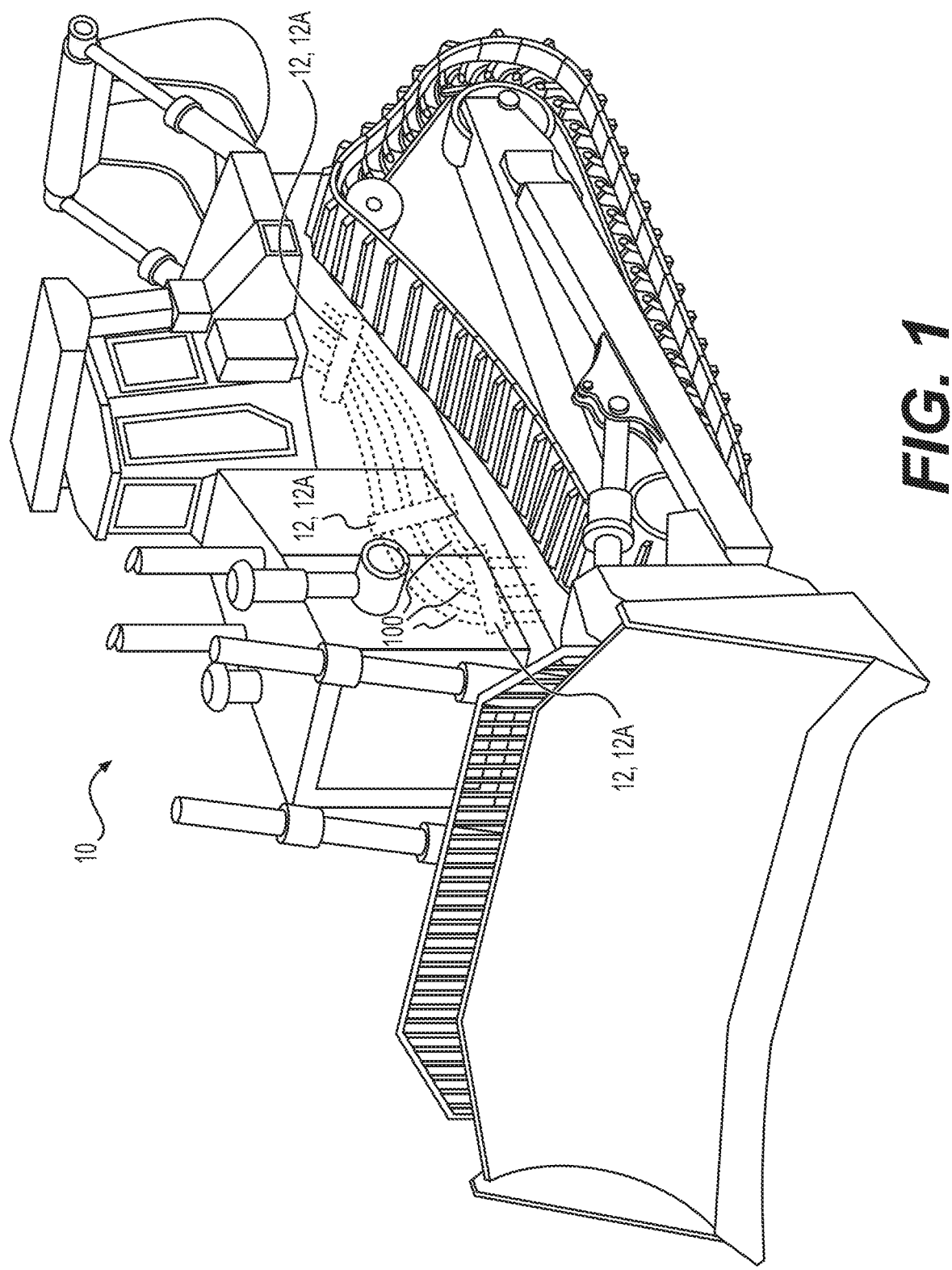
FIG. 1 is a perspective view of a machine including one or more bracket assemblies according to an aspect of the present disclosure.

FIG. 1 is a perspective view of a machine 10, such as a bulldozer, including a plurality of bracket assemblies 12, 12A. Bracket assemblies 12, 12A may be provided at various locations about the machine 10 to secure conduits 100 to a chassis or other component of machine 10. While a bulldozer is shown in FIG. 1, machine 10 may be any suitable mobile or stationary machine, such as an articulated truck, paving machine, backhoe loader, cold planer, compactor, excavator, motor grader, wheel loader, generator, etc. Conduits 100 may take any conventional form, may be formed of any conventional material, may be connected between any components of machine 10, and may convey or house any fluid or elements. For example, conduits 100 may convey hydraulic fluid, thermal management fluid, fuel, compressed air, engine exhaust and/or electricity. Two or more conduits 100 may have the same or different sizes or diameters.

Figure 2A:
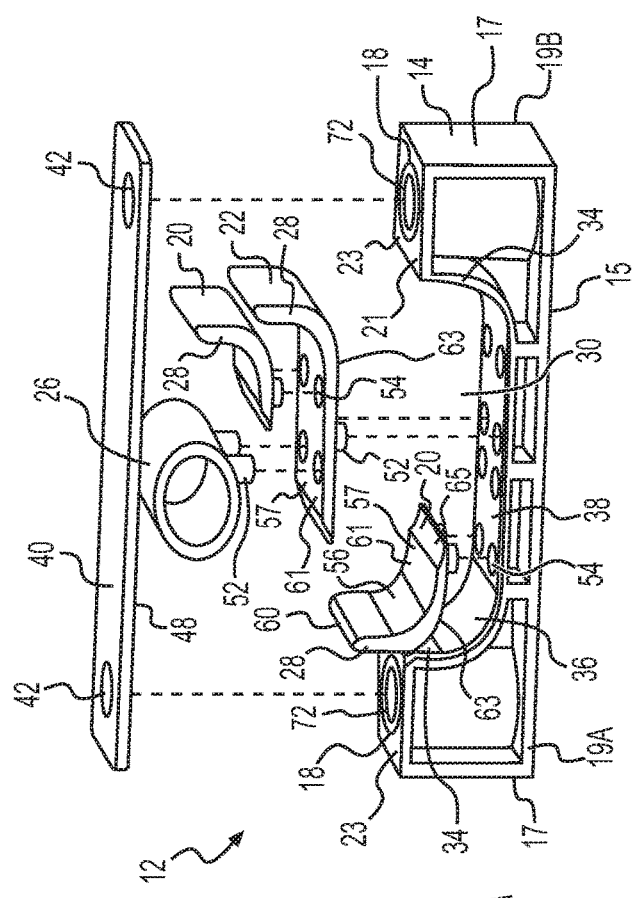
FIGS. 2A and 2B are exploded perspective views of the bracket assemblies of FIG. 1.

FIG. 2A is an exploded view illustrating an exemplary configurable bracket assembly 12 of FIG. 1. Bracket assembly 12 may include a base 14 and a securing plate 40. One or more spacer members or adapters 20, 22, 24 may be provided between base 14 and securing plate 40. One or more tubular filler members or fillers 26 may also be provided between base 14 and securing plate 40. Each of the adapters 20, 22, 24 and fillers 26 may be removably secured to base 14 or to another adapter 20, 22, 24, as will be explained in further detail below.

Base 14 may include a generally rectangular shape having a length, width, and height defining a bottom surface 15, side surfaces 17, front and back surfaces 19A and 19B, and a top surface 21. Bottom surface 15, side surfaces 17, and front and back surfaces 19A and 19B may be generally planar or include generally planar portions. For example, as shown in FIG. 2A, bottom surface 15 and side surfaces 17 may include a planar surface about substantially the entire surface, whereas front and back surfaces 19A and 19B may include hollowed out portions separated by partitions having outer planar surfaces. As used herein, relative terms, such as, for example, "about," "substantially," "generally," and "approximately" are used to indicate a possible variation of ±10% in the stated value. Additionally, it is understood that the base may have different shaped surfaces 15, 17, 19A and 19B, and 21 than those depicted in FIG. 2A.

Top surface 21 of base 14 may include a pair of substantially planar end portions 23 separated by at least one recess 30. Recess 30 may be substantially U-shaped as shown in FIG. 2A. As used herein, a U-shaped recess is a recess that includes a generally horizontally extending bottom portion and a pair of opposed generally vertically extending portions. As shown in FIG. 2A, the recess 30 includes a generally planar bottom surface 38, a pair of side surfaces 34 on opposite sides of bottom surface 38, and a pair of curved transitions 36 that extend between bottom surface 38 and side surfaces 34. It is understood that the U-shaped recess could alternatively omit the curved transitions 36, and have sharp (e.g. right angle) or semi-sharp (e.g., chamfered) transitions. Base 14 may be formed of any synthetic and/or metallic material, for example, a plastic or aluminum.

Figure 3A:
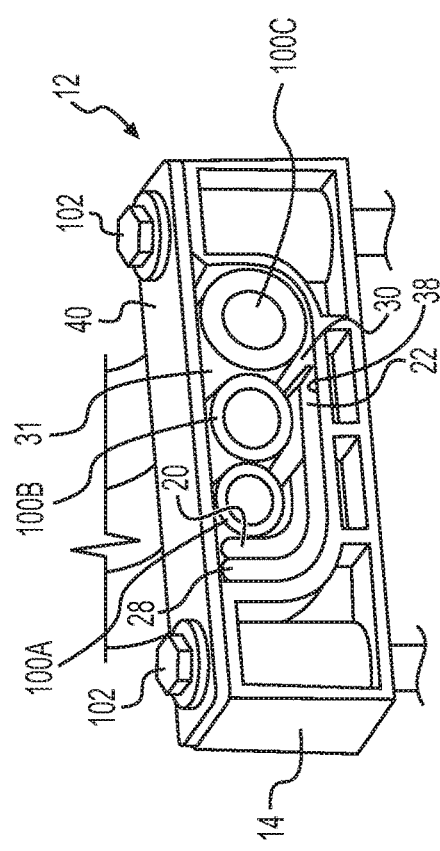
FIGS. 3A and 3B are perspective views of the bracket assemblies of FIG. 1.

Recess 30 may open toward securing plate 40, such that, as shown in FIG. 3A, a closed conduit-receiving area 31 (FIG. 3A) is formed when securing plate 40 is secured to base 14. This closed conduit-receiving area may be configured to receive one or more conduits 100, one or more adapters 20, 22, 24, or fillers 26. In the exemplary configuration shown in FIGS. 2A and 3A, recess 30 is sized (in length and height) to receive three conduits 100, but recess 30 could be sized to receive more or less conduits 100.

Adapters 20, 22, 24, and filler 26 may be provided in a plurality of different shapes and sizes that may reduce a size (height and length) of recess 30 when secured within the recess 30. Each adapter 20, 22, 24 may be sized to correspond to one or more conduits 100. For example, adapter 20 may be sized as a single-conduit adapter. Adapter 22 may be formed as a two-conduit adapter, while adapter 24 (FIG. 2B) may form a three-conduit adapter. As used herein, a single-conduit adapter 20 is sized to generally only contact one conduit when in a final secured configuration. Similarly, a two-conduit adapter 22 and three-conduit adapter 24 are sized to generally only contact two or three conduits, respectively, when the bracket assembly 12 is in a final secured configuration (FIG. 3A).

Adapters 20, 22, 24, may each include one sidewall 28 and form a substantially L-shape, or a pair of sidewalls 28 and form a substantially U-shape. For example, the single-conduit and two-conduit adapters 20, 22 may each include only one sidewall 28 and a bottom wall 57 and form a substantially L-shape, whereas three-conduit adapter 24 may have a pair of opposing sidewalls 28, and a bottom wall 57 and form a substantially U-shape. Each sidewall 28 may include a rounded or chamfered end 60 at an upper end thereof that forms a surface free of any sharp edges, particularly at a portion of sidewall 28 configured to face conduit 100. A curved transition portion 56 may be included between the sidewall 28 and bottom wall 57. A free end of bottom wall 57 (of the single-conduit and two-conduit adapters 20, 22) may include a ramped or chamfered end 65.

Adapters 20, 22, 24 may have top and bottom surfaces, 61, 63 shaped to mate with one or more surfaces 34, 36, 38 of recess 30. For example, top and bottom surface 61, 63 of adapters 20, 22, and 24 may be generally parallel to one another, and generally parallel to the surfaces 34, 36, 38 of recess 30. Thus, in such an arrangement, top and bottom surfaces 61, 63 of adapters 20, 22, 24 may form a substantially flush interface with an adjoining recess 30 and/or another adapter 20, 22, 24.

Filler 26 may be circular (e.g. tubular or cylindrical) in shape, or in any other shape to replicate a conduit within recess 30. Thus, one more fillers 26 may be used to convert a three-conduit recess 30 to a two conduit recess (using one filler 26) or a single-conduit recess 30 (using two fillers 26). While filler 26 is shown in a single tubular or cylindrical shape, it is understood that filler 26 may be formed in a two tubular shape to replicate two conduits within recess 30.

In one aspect, each of the adapters 20, 22, 24, and each filler 26 may include one or more male connectors or protrusions 52 extending from a bottom surface thereof (e.g. bottom surface 63). Base 14 may include one or more sockets 54 formed in surface 38 to receive the one or more protrusions 52. As used herein "socket" includes holes, openings, depressions, grooves, or recesses, and the holes can be through holes or blind holes. Sockets 54 may form female connectors and may be sized and shaped so as to receive a corresponding protrusion 52. In the exemplary configuration shown in FIGS. 2A, 2B, 3A, and 3B, protrusions 52 and sockets 54 may have a substantially cylindrical cross-sectional shape. However, any other shape may be provided. For example, protrusions 52 and sockets 54 may have an approximately rectangular, hexagonal, or other suitable shape. Any number of protrusions 52 and sockets 54 may be included in the various components. For example, base 14 (forming a three-conduit recess 30) may include eight sockets 54, and each of adapters 20, 22, 24, and filler 26 may include two protrusions 52. With such a configuration, adapters 20, 22, 24, and filler 26 have protrusions 52 positioned to be received in the plurality of sockets 54 in recess 30 in a first orientation and a second orientation, the second orientation corresponding to flipping of the adapter 20, 22, 24 (or filler 26) 180 degrees from the first orientation. With such a capability, sidewalls 28 or the center of filler 26 can extend on a different side of recess 30.

While protrusions 52 may be provided on bottom surfaces 63 of adapters 20, 22, 24, and fillers 26, the protrusions 52 could instead be provided on surface 38 of base 14. In such a configuration, instead of providing sockets 54 in base 14, sockets may instead be provided in adapters 20, 22, 24, and filler 26. Thus, adapters 20, 22, 24 and fillers 26 may include one of a male connector (e.g., protrusions 52) or a female connector (e.g., sockets 54), while the base 14 may include the other of the male connector and the female connector. It is understood that in any arrangement the protrusions 52 would be positioned or sized to substantially avoid interference with conduits 100.

Adapters 20, 22, 24, may include sockets 54 formed in top surface 61 thereof. These sockets 54 may have the same size and shape as sockets 54 in surface 38. For example, two-conduit adapter 22 and three-conduit adapter 24 may include two or four sockets 54 in a top surface 61 thereof. Thus, sockets 54 of adapters 20, 22, 24 may be sized to receive protrusions 52 of another adapter 20, 22, 24, or protrusions 52 of a filler 26. The sockets 54 of the adapters may be offset from the protrusions 52 of the same adapter to allow for proper stacking of adapters 20, 22, 24 and filler 26. To facilitate the use of multiple adapters within a recess 30, adapters 20, 22, 24, as well as fillers 26 may each be provided in a plurality of different sizes, even when the protrusions 52 and sockets 54 of these features have the same size. In one aspect, adapters of the same type (e.g., single-conduit adapters 20), may be provided in a plurality of different sizes. For example, as shown in FIG. 2A, a first single-conduit adapter 20 (left adapter 20 in FIG. 2A) may have a first size that is larger than the size of a second single-conduit adapter 20 (right adapter 20 in FIG. 2A). As can be seen in FIG. 2A, the use of smaller adapters (e.g., adapter 20 on the right portion of FIG. 2A) may further facilitate the insertion of a plurality of adapters for a single conduit 100 in recess 30.

Top surface 21 of base 14 may include a pair of through-holes or fastener bores 72 at opposite longitudinal ends of base 14. For example, bores 72 may be located on the pair of substantially planar portions 23 of top surface 21 of base 14. Fastener bores 72 may align with corresponding fastener bores 42 that extend through securing plate 40 to receive a common fastener (e.g. bolt fastener 102 shown in FIGS. 3A and 3B). In one aspect, when base 14 is formed of plastic material, a protective bushing 18 may be provided within fastener bores 42 to provide additional strength to allow base 14 to receive a fastener. Bores 72 may be threaded or unthreaded, and may extend completely through the height of the base 14 to form a through hole (from top surface 21 to bottom surface 15) to assist in securing bracket assembly 12 to components of machine 10. Alternatively bores 72 may form blind holes and the bracket assembly 12 may be secured to the machine 10 in an alternative manner.

Figure 2B:
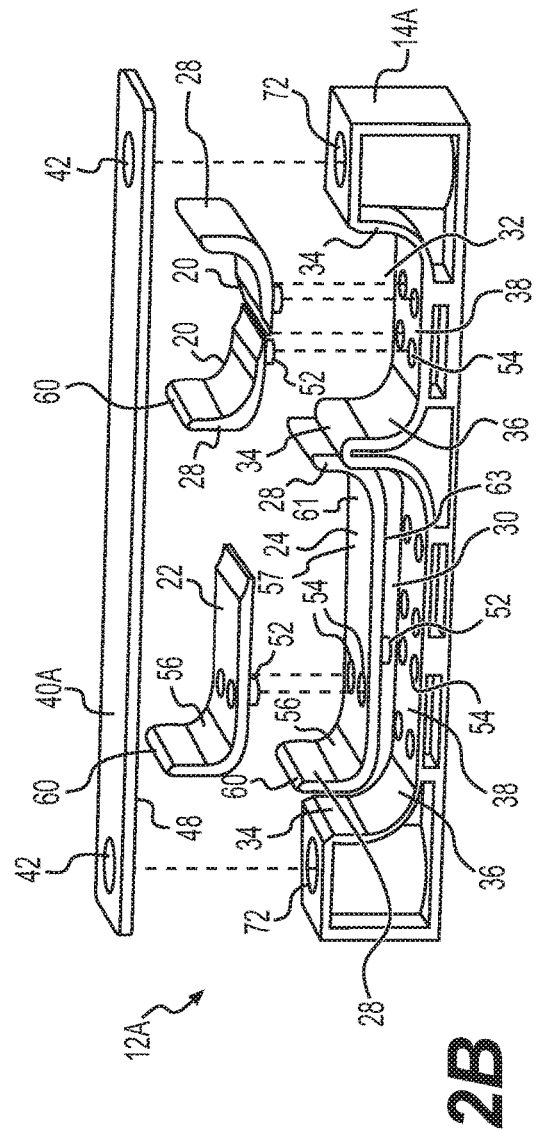

FIG. 2B is an exploded perspective view showing a bracket assembly 12A of FIG. 1. Similar reference numbers used to describe the bracket assembly 12B in FIG. 2B correspond to the same or similar elements in the bracket assembly 12 of FIG. 2B discussed above. Bracket assembly 12A may include a plurality of recesses, such as a first recess 30 and a second recess 32. Second recess 32 may have a similar shape as first recess 30, and may also include a bottom surface 38 having a plurality of sockets 54. The plurality of recesses defined by base 14A (e.g., recesses 30, 32) may have different sizes. For example, as shown in FIG. a length of first recess 30 may correspond to a three-conduit recess having a greater length than second recess 32 configured as a two-conduit recess. While two recesses are shown in the exemplary bracket assembly 12A of FIG. 2B, additional recesses may be defined by base 14 and closed or covered by securing plate 40A. Additionally, recesses 30, 32 may have the same size if desired. For example, both recesses 30, 32 may be two-conduit recesses or three-conduit recesses.

Figure 3B:
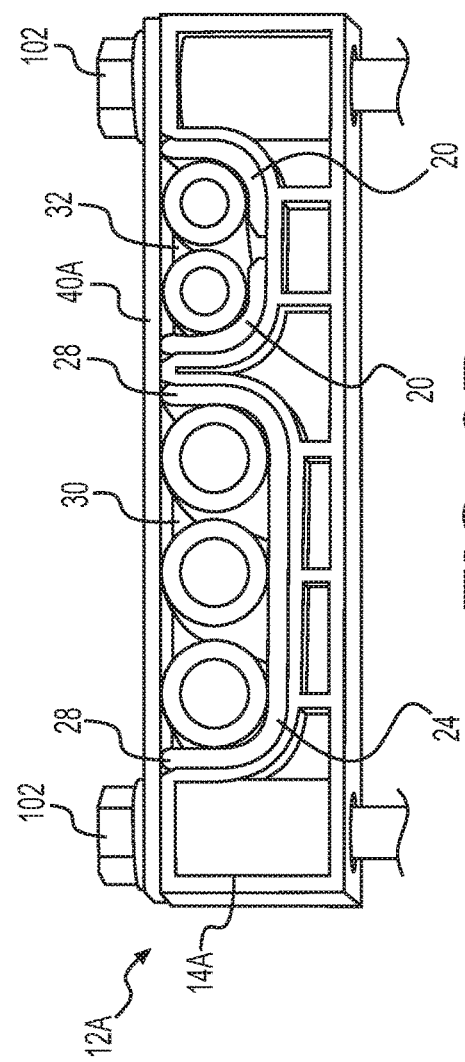

As can be seen in FIGS. 2A and 2B, securing plate 40, 40A may be rectangular in shape, having a length and width generally corresponding to the length and width of base 14, 14A. Securing plate 40, 40A may be formed of any synthetic and/or metallic material, for example, a plastic or aluminum. As noted above, securing plate 40, 40A may include a pair of fastener bores 42 at opposite longitudinal ends thereof for receiving fastener 102 (FIGS. 3A, 3B). The fastener bores 42 may align with respective fastener bores 72 of base 14, 14A. With respect to the bracket assembly 12A, a single plate 40A may extend across and close the plurality of recesses 30, 32. In an alternative arrangement, an additional base bore 72 bore may be included between the recesses 30, 32, and two securing plates could be used, one securing plate to close or secure each recess 30, 32.

FIG. 3A is a perspective view of an exemplary bracket assembly 12 in an exemplary assembled configuration that corresponds to FIG. 2A, with filler 26 and one of the adapters 20 removed. In this assembled configuration, securing plate 40 may clamp or secure three conduits 100 within recess 30 with the use of two adapters, a single-conduit adapter 20 stacked on top of a two-conduit adapter 22. Adapters 20, 22, and/or 24 (and filler 26) may be assembled in various other configurations within recess 30 than that shown in FIG. 3A. For example, while the sidewall 28 of adapter 22 in FIG. 3A is positioned flush with the sidewall 34 of recess 30, the adapter 22 can be secured via different sockets 54 of base 14 so that the sidewall 28 of adapter 22 is spaced from the sidewall 34 of recess 30.

As can be seen in FIG. 3A, a pair of adapters 20, 22, may be mated (removably connected) together in recess 30 so as to receive a first conduit 100A having a relatively smaller diameter. The two-conduit adapter 22 may extend between a middle conduit 100B and bottom surface 38 of base 14. A third conduit 100C may be the largest conduit and be secured against the recess 30 and a lower surface 48 of securing plate 40 without the need for an adapter 22, 24, 26. Alternatively, if bracket assembly 12 will only receive two conduits, a filler 26 may be secured within recess 30. Filler 26 may have a shape that allows an outer surface thereof to press against an outer circumferential surface of one of the remaining conduits 100.

FIG. 3B is a perspective view of bracket assembly 12A in an assembled configuration with adapter 22 omitted, showing a plurality of conduits 100 extending through recesses 30, 32. In the exemplary assembled configuration of shown in FIG. 3B, a three-conduit adapter 24 may extend across an entirety of surface 38 of first recess 30 and may include a pair of side walls 28. These side walls 28 may contact side walls 34 of base 14A. First recess 30 may alternatively be configured to receive any suitable combination of three, two, and single-conduit adapters 20, 22, 24, and/or one or more fillers 26 via protrusions 52 and sockets 54.

In the exemplary configuration shown in FIG. 3B, a pair of single-conduit adapters 20 (or a single two-conduit adapter 22) may be provided in second recess 32 to reduce a length and height of recess 32. Second recess 32 may be alternatively configured to receive any suitable combination of two or single-conduit adapters 20, 22, and/or a filler 26.

INDUSTRIAL APPLICABILITY

The disclosed aspects of bracket assembly 12, 12A may be employed in any machine, vehicle, or internal combustion engine in which a plurality of conduits 100 are provided. For example, bracket assembly 12, 12A may be employed in a mobile industrial machine 10 such as a bulldozer. However, bracket assembly 12, 12A may be employed in any machine to reliably secure a plurality of conduits 100.

A plurality of adapters 20, 22, 24 may be connected to a base 14, 14A in order to reduce a size (length and height) of one or more recesses 30, 32 that receive conduits 100. For example, as shown in FIG. 3A, a first position within recess 30 may include a plurality (e.g., two) adapters 20, 22, while other positions within recess 30 contain one adapter or no adapters. Thus, the size of recess 30 may be customizable. Each adapter may be easily secured by the male-female connectors of protrusions 52 and sockets 54. Thus, base 14, 14A may receive one or more removable adapters 20, 22, 24. Once a size of recess 30 has been reduced in a desired manner by inserting adapters 20, 22, 24 and/or fillers 26, conduits 100 may be received within recess 30 and/or 32.

One or more conduits 100 may extend through recess 30 and/or 32 and may be secured by assembling securing plate 40 on base 14 such that a second surface 48 formed by securing plate 40 faces each of the conduits 100 and the surface 38 of the recess 30, 32. In one aspect, conduits 100 may press against second surface 48 of securing plate 40, a vertically-extending surface of side wall 28, curved surface 56 of side wall 28, and/or a flat bottom surface of an adapter 20, 22, 24. Similar to curved surface 56, curved transition surface 36 may be shaped to receive an outer diameter of conduit 100. Adjacent conduits 100 may also press against each other, or against a filler 26. Thus, a plurality of conduits 100 may be reliably secured within a single recess 30, 32. Fasteners such as bolts 102 may secure bracket assemblies 12, 12A to desired portions of a chassis or other component of machine 10 (e.g., via one or more bosses present on the chassis). By tightening bolts 102, an appropriate amount of force may be applied to conduits 100 via plate 40, 40A.

Bracket assemblies 12, 12A may thus form securing mechanisms configured to receive a plurality of different conduits within a single recess 30, 32, and may reduce the amount of space needed to secure conduits 100 to a machine 10. Thus, it may be possible to secure a plurality of the same or differently sized conduits with a single, uniform bracket assembly 12, 12A. Such an arrangement may avoid the need for clamps, such as P-clamps, which hold individual conduits or pipes. Additionally, by providing a plurality of adapters with different sizes and shapes, it may be possible to accommodate a different number of conduits 100 and conduits 100 having different sizes without the need to manufacture separate assemblies for each combination of conduit numbers and sizes. Further, with such adaptability, the bracket assembly 12, 12A can be used an numerous different places on machine 10, or across different types of machines. Additionally, the size of conduits 100 that may be secured by bracket assembly 12, 12A may vary considerably. The provision of curved and/or rounded surfaces and chamfers may prevent damage to conduits 100, which may be connected to an internal combustion engine and experience vibration.

What is claimed is:

1. A bracket assembly for securing a plurality of conduits, the bracket assembly comprising:
   a base including at least one recess, the at least one recess defined by a bottom surface and a pair of side surfaces, wherein the at least one recess includes at least one socket;
   a securing member configured to mate with the base and extend across the at least one recess to form a conduit-receiving area; and
   at least one adapter coupled to the at least one recess to reduce the size of the conduit-receiving area, wherein the at least one adapter includes at least one protrusion, wherein the at least one adapter is coupled to the at least one recess by mating of the at least one protrusion and the at least one socket, and wherein the at least one adapter further includes at least one socket on a side of the at least one adapter opposite to the at least one protrusion configured to receive a protrusion on a filler member or another adapter.

2. The bracket assembly of claim 1, wherein the at least one recess is substantially U-shaped.

3. The bracket assembly of claim 1, wherein the base includes a fastener bore located on each side of the at least one recess.

4. The bracket assembly of claim 1, wherein the at least one adapter is a first adapter and the bracket assembly further includes a second adapter, the second adapter coupled to the at least one recess to reduce the size of the conduit-receiving area.

5. The bracket assembly of claim 1, further including a substantially circular filler member coupled within the at least one recess to reduce the size of the conduit-receiving area.

6. The bracket assembly of claim 5, wherein the circular filler member includes at least one protrusion extending therefrom to secure the circular filler member in the at least one recess.

7. The bracket assembly of claim 1, wherein the at least one adapter includes a top surface and a bottom surface that are both generally parallel to one another and generally parallel to a mating surface of the at least one recess.

8. The bracket assembly of claim 1, wherein the at least one adapter includes a substantially L-shape or a substantially U-shape.

9. The bracket assembly of claim 1, further including a plurality of adapters, including a single-conduit adapter, a two-conduit adapter, and a three-conduit adapter.

10. The bracket assembly of claim 1, wherein the base includes a plurality of U-shaped recesses.

11. The bracket assembly of claim 10, wherein the plurality of recesses have different sizes.

12. The bracket assembly of claim 1, wherein the securing member is a plate, and the bracket assembly further includes a pair of fasteners coupling the plate and the base, and extending through the base to secure the bracket assembly to a machine.

13. A bracket assembly for securing a plurality of conduits, the bracket assembly comprising:
   a base including at least one substantially U-shaped recess, the recess defined by a bottom surface and a pair of side surfaces, the base further including a fastener bore located on each side of the recess, and the recess includes a plurality of sockets;
   a securing plate configured to mate with the base and extend across the recess to form a conduit-receiving area; and
   a plurality of adapters configured to be coupled to the recess to reduce the size of the conduit-receiving area, the plurality of adapters including a plurality of protrusions, and the plurality of adapters being configured to be coupled to the recess by mating of the protrusions and sockets,
   wherein the plurality of adapters includes a single-conduit adapter, a two-conduit adapter, and a three-conduit adapter.

14. The bracket assembly of claim 13, wherein each adapter of the plurality of adapters is one of L-shaped or U-shaped.

15. The bracket assembly of claim 13, wherein at least one of the plurality of adapters is coupled to within the recess.

16. The bracket assembly of claim 13, further comprising a pair of fasteners coupling the securing plate and the base, and extending through the base to secure the bracket assembly to a machine.

* * * * *